United States Patent
Song et al.

(10) Patent No.: US 9,588,349 B2
(45) Date of Patent: Mar. 7, 2017

(54) LIQUID CRYSTAL LENS COMPRISING FIRST, SECOND, AND THIRD LENS ELECTRODES AND STEREOSCOPIC DISPLAY DEVICE INCLUDING THE SAME

(71) Applicant: Samsung Display Co., Ltd., Yongin (KR)

(72) Inventors: Se-Young Song, Yongin (KR); Kwang-Chul Jung, Yongin (KR); Mee-Hye Jung, Yongin (KR); Sun-Hwa Lee, Yongin (KR); In-Jae Hwang, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 120 days.

(21) Appl. No.: 14/204,486

(22) Filed: Mar. 11, 2014

(65) Prior Publication Data

US 2015/0077666 A1    Mar. 19, 2015

(30) Foreign Application Priority Data

Sep. 13, 2013    (KR) ........................ 10-2013-0110237

(51) Int. Cl.
*G02B 27/22* (2006.01)
*G02F 1/29* (2006.01)
*G02F 1/1345* (2006.01)

(52) U.S. Cl.
CPC ....... *G02B 27/2214* (2013.01); *G02F 1/1345* (2013.01); *G02F 1/29* (2013.01)

(58) Field of Classification Search
CPC .......... G02F 1/29; G02F 1/1345; H04N 13/00
USPC .................................................. 349/200–201
See application file for complete search history.

(56) References Cited

U.S. PATENT DOCUMENTS

| | | |
|---|---|---|
| 6,734,925 B1 | 5/2004 | Lee et al. |
| 2007/0296911 A1 | 12/2007 | Hong |
| 2010/0079584 A1 | 4/2010 | Sung et al. |
| 2011/0188106 A1 | 8/2011 | Bae et al. |
| 2011/0228181 A1 | 9/2011 | Jeong et al. |
| 2012/0229712 A1 | 9/2012 | Yoshida et al. |
| 2012/0300042 A1* | 11/2012 | Yun .................... H04N 13/0404 348/51 |
| 2013/0107147 A1 | 5/2013 | Whangbo et al. |

FOREIGN PATENT DOCUMENTS

| | | |
|---|---|---|
| JP | 2007-240670 | 9/2007 |
| JP | 2009-192826 | 8/2009 |
| KR | 10-2008-0040851 | 5/2008 |

(Continued)

*Primary Examiner* — Paul Lee
(74) *Attorney, Agent, or Firm* — H.C. Park & Associates, PLC (57) ABSTRACT

A liquid crystal lens includes a first lens electrode, a second lens electrode, bus lines, and a contact portion. The first lens electrode is disposed in at least a display area of the liquid crystal lens. The second lens electrode is disposed in at least the display area. The bus lines are disposed in a peripheral area of the liquid crystal lens, the peripheral area being disposed outside the display area, the first lens electrode and the second lens electrode being connected to respective ones of the bus lines. The contact portion overlaps the bus lines and electrically connects the respective bus lines to the first lens electrode and the second lens electrode.

18 Claims, 6 Drawing Sheets

(56) References Cited

FOREIGN PATENT DOCUMENTS

| KR | 10-2009-0004006 | 1/2009 |
|----|-----------------|--------|
| KR | 10-0943284      | 2/2010 |
| KR | 10-2010-0075301 | 7/2010 |
| KR | 10-2011-0104701 | 9/2011 |

* cited by examiner

LIQUID CRYSTAL LENS COMPRISING FIRST, SECOND, AND THIRD LENS ELECTRODES AND STEREOSCOPIC DISPLAY DEVICE INCLUDING THE SAME

CROSS-REFERENCE TO RELATED APPLICATION

This application claims priority from and the benefit of Korean Patent Application No. 10-2013-0110237, filed on Sep. 13, 2013, in the Korean Intellectual Property Office, the entire contents of which are incorporated herein by reference in their entirety.

BACKGROUND

Field

Exemplary embodiments relate to display technology, and, more particularly, to a liquid crystal lens and a stereoscopic display device including the same.

Discussion

With the development of information hungry society, display devices configured to display information are of interest. For instance, conventional display devices typically include, for instance, liquid crystal display devices, organic electro-luminescence display devices, plasma display devices, field emission display devices, electrophoretic display devices, electrowetting display devices, and the like. Users, however, also desire stereoscopic image presentation. As such, devices to implement stereoscopic imaging are on the rise. For example, liquid crystal lenses have been proposed as a way to implement stereoscopic imaging using conventional display device technology.

A typical liquid crystal lens may include a display area in which an image output from a display device is stereoscopically displayed and a non-display area in which the image is not displayed. To this end, a plurality of lens units may be disposed in the display area. Each lens unit may include a lower substrate on which first and second electrodes are alternately disposed, an upper substrate on which a third electrode is disposed, and a liquid crystal layer formed between the upper and lower substrates.

A plurality of bus (or transmission) lines may be connected to the first and second electrodes of the lens unit and a pad portion connected to a side of the plurality of bus lines to provide a driving voltage to the first and second electrodes may be disposed in the non-display area. In this manner, the pad portion may also provide a driving voltage to the third electrode. If different driving voltages are applied to one or more of the first to third electrodes, an electric field may be formed between the lower and upper substrates in the lens unit. The electric field may be decreased as the electric field approaches an edge of the lens unit. It is noted that liquid crystal molecules of the liquid crystal layer may be driven (e.g., oriented) based on the distribution of the electric field. As such, the liquid crystal layer may act as a lens. To this end, the advancing direction of light may be controlled by the lens to display a stereoscopic image.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal lens and a stereoscopic display device including the same that are configured to minimize a bezel area.

Additional aspects will be set forth in the detailed description which follows, and, in part, will be apparent from the disclosure, or may be learned by practice of the inventive concept.

According to exemplary embodiments, a liquid crystal lens includes a first lens electrode, a second lens electrode, bus lines, and a contact portion. The first lens electrode is disposed in at least a display area of the liquid crystal lens. The second lens electrode is disposed in at least the display area. The bus lines are disposed in a peripheral area of the liquid crystal lens, the peripheral area being disposed outside the display area, the first lens electrode and the second lens electrode being connected to respective ones of the bus lines. The contact portion overlaps the bus lines and electrically connects the respective bus lines to the first lens electrode and the second lens electrode.

According to exemplary embodiments, a stereoscopic display device includes: a display panel, a liquid crystal lens disposed on the display panel, and a voltage source. The display panel is configured to display a two-dimensional image. The liquid crystal lens includes a first lens electrode, a second lens electrode, bus lines, and a contact portion. The first lens electrode is disposed in at least a display area of the liquid crystal lens. The second lens electrode is disposed in at least the display area. The bus lines are disposed in a peripheral area of the liquid crystal lens, the peripheral area being disposed outside the display area, the first lens electrode and the second lens electrode being connected to respective ones of the bus lines. The contact portion overlaps the bus lines and electrically connects the respective bus lines to the first lens electrode and the second lens electrode. The voltage source is configured to apply a voltage to the first lens electrode and the second lens electrode. The two-dimensional image is perceived as a stereoscopic image through the liquid crystal lens.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiment.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
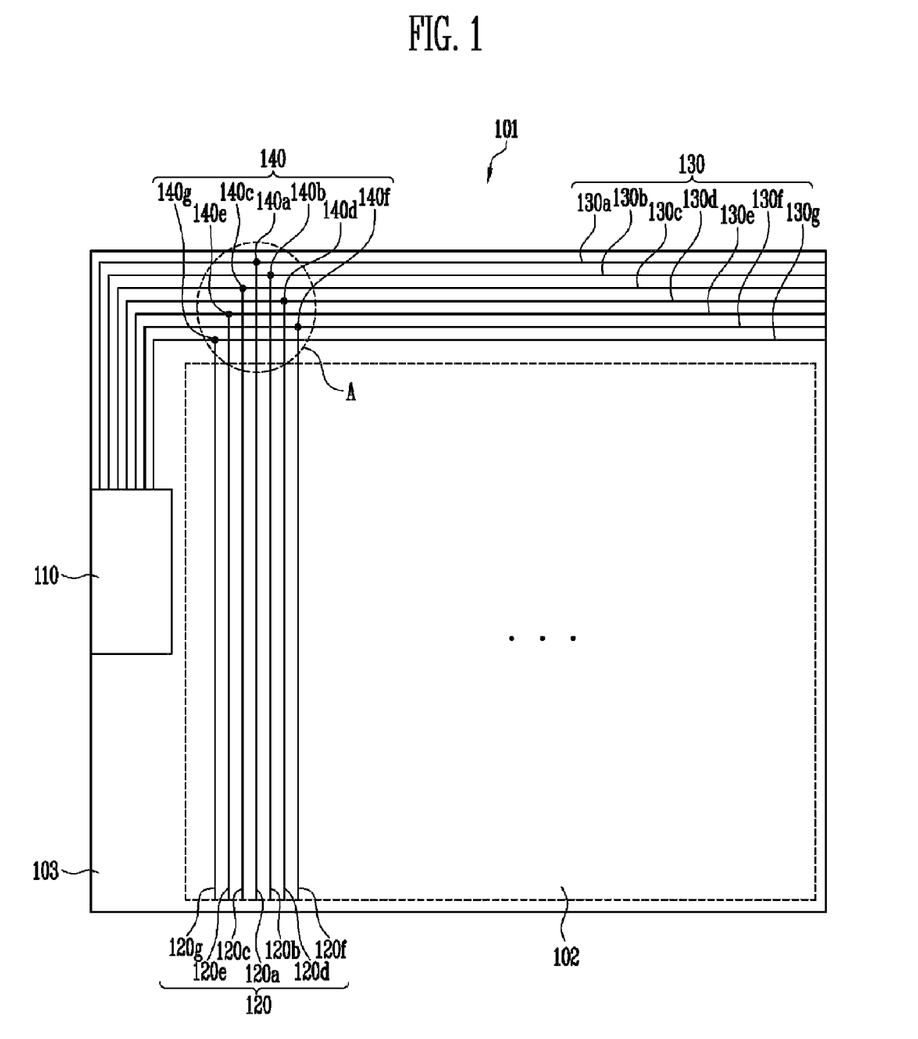
FIG. 1 schematically illustrates a liquid crystal lens, according to exemplary embodiments.
Figure 2:
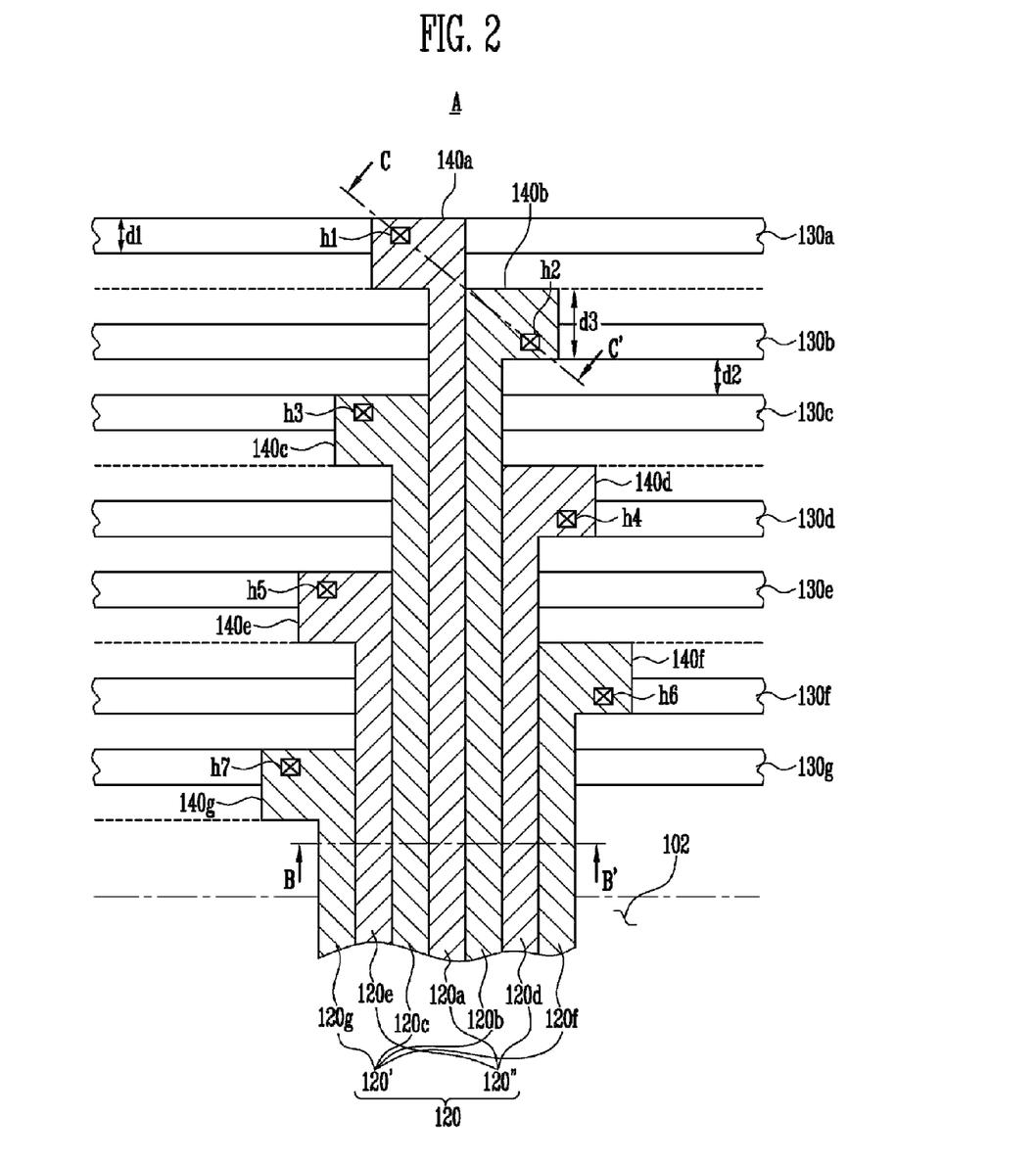
FIG. 2 is an enlarged view of portion A of the liquid crystal lens of FIG. 1, according to exemplary embodiments.

FIG. 1 schematically illustrates a liquid crystal lens, according to exemplary embodiments. FIG. 2 is an enlarged view of portion A of the liquid crystal lens of FIG. 1.

As shown in FIGS. 1 and 2, a liquid crystal lens 101 may be divided into a display area 102 in which an image output from a display device may be stereoscopically displayed and a non-display area 103 disposed outside the display area 102. It is noted that the image may not be displayed in the non-display area 103.

A plurality of lens units 120 may be disposed in the display area 102. Each lens unit 120 may include a lower substrate (not shown) on which first and second lens electrode portions 120' and 120" may be alternately disposed with one another, an upper substrate (not illustrated) on which a third lens electrode (not shown) may be formed, and a liquid crystal layer (not illustrated) formed between the upper and lower substrates. The third lens electrode may be a common electrode configured to apply a common voltage commonly used in the plurality of lens units 120. The third lens electrode may be disposed in an entire (or substantially entire) area of the upper substrate.

According to exemplary embodiments, a plurality of bus (or transmission) lines 130 may be disposed in the non-display area 103, which may also include a pad portion 110 connected to the plurality of bus lines 130. It is noted that the pad portion 110 may be connected to the same side of each of the plurality of bus lines 130.

The first lens electrode portion 120' may include second and third lens electrodes 120b and 120c, as well as sixth and seventh lens electrodes 120f and 120g. The second, third, sixth, and seventh lens electrodes 120b, 120c, 120f, and 120g may be formed in the same layer. The second lens electrode portion 120" may include first lens electrode 120a and fourth and fifth lens electrodes 120d and 120e. The first, fourth, and fifth lens electrodes 120a, 120d, and 120e may be formed in the same layer. It is noted, however, that the first and second lens electrode portions 120' and 120" may be disposed in different layers than one another.

The lens unit 120 may have a structure in which the lens electrodes formed in different layers may be alternately disposed in either lateral direction from the first lens electrode 120*a*. In this manner, the first lens electrode 120*a* may be disposed in a middle portion of the lens unit 120. As such, the first and seventh lens electrodes 120*a* to 120*g* may be formed in different layers and may be alternately disposed adjacent to each other in a first lateral direction. The first and sixth lens electrodes 120*a* and 120*f* may also be formed in different layers and may be alternately disposed adjacent to each other in a second lateral direction, which may be opposite the first lateral direction. The third and fifth lens electrodes 120*c* and 120*e* may be alternately disposed between the first and seventh lens electrodes 120*a* and 120*g*. The second and fourth lens electrodes 120*b* and 120*d* may be alternately disposed between the first and sixth lens electrodes 120*a* and 120*f*. It is noted that adjacent lens electrodes of the first and second lens electrode portions 120' and 120" may be disposed adjacent to an extent where the lateral distance between adjacent lens electrodes of the first and second lens electrode portions 120' and 120" is almost zero.

The plurality of bus lines 130 include first to seventh bus lines 130*a* to 130*g* respectively connected to the first to seventh lens electrodes 120*a* to 120*g*. Different driving voltages may be applied to the first to seventh bus lines 130*a* to 130*g* via the pad portion 110. The first to seventh lens electrodes 120*a* to 120*g* may be electrically connected to the respective bus lines 130*a* to 130*g* through a contact portion 140. In this manner, the driving voltages applied from the pad portion 110 to the bus lines 130 may be applied to the first to seventh lens electrodes 120*a* to 120*g* through the contact portion 140.

According to exemplary embodiments, the contact portion 140 may include first to seventh contact portions 140*a* to 140*g* respectively corresponding to the first to seventh bus lines 130*a* to 130*g*. The first to seventh contact portions 140*a* to 140*g* respectively include first to seventh contact holes h1 to h7. The first to seventh contact portions 140*a* to 140*g* are respectively electrically connected to the corresponding first to seventh bus lines 130*a* to 130*g* through the first to seventh contact holes h1 to h7. In this manner, the first to seventh bus lines 130*a* to 130*g* are respectively connected to the first to seventh lens electrodes 120*a* to 120*g* through the first to seventh contact portions 140*a* to 140*g*.

The first to seventh contact portions 140*a* to 140*g* are respectively overlapped by the corresponding first to seventh bus lines 130*a* to 130*g* in the non-display area 130. The second and third contact portions 140*b* and 140*c* are respectively disposed on either lateral sides of the first contact portion 140*a*, which may be overlapped by the first bus line 130*a* in the non-display area 103. The second contact portion 140*b* may be disposed between the fourth contact portion 140*d* and the first contact portion 140*a*. The third contact portion 140*c* may be disposed between the fifth contact portion 140*e* and the first contact portion 140*a*. The fifth contact portion 140*e* may be disposed between the seventh contact portion 140*g* and the third contact portion 140*c*. The fourth contact portion 140*d* may be disposed between the sixth contact portion 140*f* and the second contact portion 140*b*. In this manner, the second, fourth, and sixth contact portions 140*b*, 140*d*, and 140*f* may be disposed to a first (e.g., right) lateral side of the first contact portion 140*a*, whereas the third, fifth, and seventh contact portions 140*c*, 140*e*, and 140*g* may be disposed to a second (e.g., left) lateral side of the first contact portion 140*a*.

According to exemplary embodiments, adjacent contact portions 140 may be formed in different layers from each other. That is, the first to seventh contact portions 140*a* to 140*g* may be formed of the same material and in the same respective layers as the respectively corresponding first to seventh lens electrodes 120*a* to 120*g*. The first to seventh contact portions 140*a* to 140*g* respectively corresponding to the first to seventh lens electrodes 120*a* to 120*g* may be alternately disposed in, for instance, a zigzag formation at either lateral sides of the first contact portion 140*a*.

To decrease the area of the non-display area 103, each of the first to seventh bus lines 130*a* to 130*g* may be formed having a width in consideration of a process margin (or minimum feature size). For instance, each of the first to seventh bus lines 130*a* to 130*g* may have a width d1 of a minimum 5 μm or more. In addition, each of the first to seventh contact portions 140*a* to 140*g* may be designed to have a width d3 a minimum 12 μm or more. Each of the first to seventh contact portions 140*a* to 140*g* may or may not partially overlap a corresponding bus line 130*a* to 130*g*.

According to exemplary embodiments, the second and third contact portions 140*b* and 140*c* may respectively overlap the second and third bus lines 130*b* and 130*c*, and a distance d2 between the second and third bus lines 130*b* and 130*c* may be about 5 μm. The fourth and fifth contact portions 140*d* and 140*e* may respectively overlap the fourth and fifth bus lines 130*d* and 130*e*, and the distance d2 between the forth and fifth bus lines 130*d* and 130*e* may also be about 5 μm. The sixth and seventh contact portions 140*f* and 140*g* may respectively overlap the sixth and seventh bus lines 130*f* and 130*g*, and the distance d2 between the sixth and seventh bus lines 130*f* and 130*g* may also be about 5 μm. That is, the distance between two adjacent bus lines corresponding to consecutive even and odd-numbered bus lines among the bus lines 130*b* to 130*g* positioned below the first bus line 130*a* may be about 5 μm.

In exemplary embodiments, adjacent bus lines 130 corresponding to the consecutive even and odd-numbered bus lines 130 may respectively overlap the corresponding contact portions 140 formed in the same layer. The distance between the adjacent bus lines 130 corresponding to consecutive odd and even-numbered bus lines 130 may be wider than that the distance d2 between the adjacent bus lines 130 corresponding to the consecutive even and odd-numbered bus lines 130. In this manner, the adjacent bus lines 130 corresponding to the consecutive odd and even-numbered bus lines 130 may respectively overlap the corresponding contact portions 140 formed in different layers. For example, the distance between the first and second bus lines 130*a* and 130*b* respectively overlapping the first and second contact portions 140*a* and 140*b*, which may be formed in different layers may be wider than the distance d2 between the second and third bus lines 130*b* and 130*c* respectively overlapping the second and third contact portions 140*b* and 140*c*, which may be formed in the same layer.

It is noted that the above-noted formation may enable the bus lines 130 to have a width of a minimum of 5 μm or more and adjacent contact portions 140 formed in different layers to maintain a width d3 of 12 μm on the respective corresponding bus lines 130. In this manner, adjacent contact portions 140 formed in different layers may not overlap with each other or may partially overlap the corresponding bus lines 310 according to the process margins. As such, the adjacent contact portions 140 connected to consecutive adjacent bus lines 130 and formed in different layers may be disposed to an extent where the distance between the adjacent contact portions 140 is close to zero. To this end, the width d3 of each of the adjacent contact portions 140 may be constantly maintained. For example, when the width of each of the first and second bus lines 130a and 130b is about 5 Jim, the first and second contact portions 140a and 140b formed in different layers may be disposed to an extent where the distance between the first and second contact portions 140a and 140b is close to zero. As such, the width d3 of each of the first and second contact portions 140a and 140b can be constantly maintained. In this manner, the width from the first bus line 130a to between the second and third bus lines 130b and 130c may be 27 μm.

In exemplary embodiments, the distance between adjacent contact portions 140 respectively overlapping adjacent bus lines 130 corresponding to the consecutive even and odd-numbered bus lines 130 formed in the same layer may be the same (or substantially the same) as that the distance d2 between the corresponding adjacent bus lines 130. For example, when the width of each of the second and third bus lines 130b and 130c is about 5 μm, the second and third contact portions 140b and 140c formed in the same layer maintain the width d3 on the respective corresponding second and third bus lines 130b and 130c. In this manner, the contact portions 140 connected to the adjacent bus lines 130 corresponding to the consecutive even and odd-numbered bus lines 130 and formed in the same layer may constantly maintain the width d3. As such, the bus line 130 may have a width of a minimum of 5 μm or more in consideration of the process margin, and the contact portions 140 corresponding to the bus line 130 may be disposed in a zigzag formation about the first contact portion 140a in the non-display area 103. This configuration may enable the size of the entire bezel area of the display device to be decreased.

Figure 3:
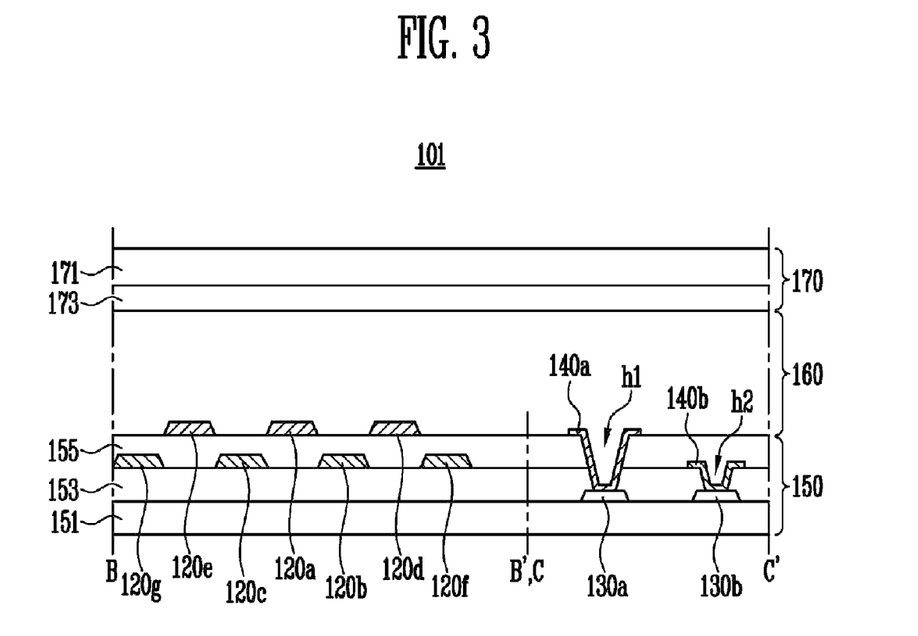
FIG. 3 is a sectional view of the liquid crystal lens of FIG. 2 taken along sectional lines B-B' and C-C', according to exemplary embodiments.

FIG. 3 is a sectional view of the liquid crystal lens of FIG. 2 taken along sectional lines B-B' and C-C', according to exemplary embodiments.

Referring to FIGS. 2 and 3, the liquid crystal lens 101 may include a lower substrate 150, an upper substrate 170, and a liquid crystal layer 160 formed between the lower and upper substrates 150 and 170. The lower substrate 150 may include the first and second bus lines 130a and 130b formed on a first substrate 151, and a first insulating layer 153 formed on the first and second bus lines 130a and 130b. The first and second bus lines 130a and 130b may be formed with a single layer configuration including any suitable material, such as one of molybdenum (Mo), aluminum neodymium (AlNd), and tungsten W, or a double layer structure including two of the aforementioned materials.

According to exemplary embodiments, the first insulating layer 153 may be made of any suitable insulating material, such as, for example, an organic or inorganic material. The first insulating layer 153 may be formed with several layers including different organic or inorganic materials. Further, the lower substrate 150 may include a second contact hole h2 through which a portion of the second bus line 130b may be exposed by patterning the first insulating layer 153 and a first lens electrode portion 120'. A second contact portion 140b, which may be formed on the first substrate 151, may be formed at least in the second contact hole h2. In this manner, the first lens electrode portion 120' and the second contact portion 140b may be formed of the same material in the same layer. The first lens electrode portion 120' may be made of any suitable transparent conductive material, such as, for example, aluminum zinc oxide (AZO), gallium zinc oxide (GZO), indium tin oxide (ITO), indium zinc oxide (IZO), indium tin zinc oxide (ITZO), etc. It is also contemplated that one or more conductive polymers (ICP) may be utilized, such as, for example, polyaniline, poly(3,4-ethylenedioxythiophene) poly(styrenesulfonate) (PEDOT:PSS), etc. The second bus line 130b and the second contact portion 140b may be electrically connected through the second contact hole h2. As such, a second electrode lens 120b of the first lens electrode portion 120', corresponding to the second contact portion 140b, may be electrically connected to the second bus line 130b.

As seen in FIG. 3, the lower substrate 150 may further include a second insulating layer 155 formed on the first lens electrode portion 120' and the second contact portion 140b. A first contact hole h1, through which a portion of the first bus line 130a may be exposed, may be formed by patterning the second insulating layer 155, the first insulating layer 153, and a second lens electrode portion 120" formed on the first substrate 151. The second insulating layer 155 may be made of any suitable insulating material, such as, for example, an organic or inorganic material. The second insulating layer 155 may be formed of several layers including different organic and/or inorganic materials. To this end, the second lens electrode portion 120" and the first contact portion 140a may be formed of the same material in the same layer. The lens electrode portion 120" may be made of any suitable transparent conductive material, such as, for example, AZO, GZO, ITO, IZO, ITZO, etc. It is also contemplated that one or more ICPs may be utilized, such as, for example, polyaniline, PEDOT:PSS, etc. As such, the first bus line 130a and the first contact portion 140a may be electrically connected through the first contact hole h1. Further, the second lens electrode portion 120" corresponding to the first contact portion 140a may be electrically connected to the first bus line 130a.

As seen in FIG. 3, a third electrode 173 may be formed on the entire (or substantially entire) area (or surface) of a second substrate 171 in the upper substrate 170. The third electrode 173 may be made of any suitable transparent conductive material, such as, for example, AZO, GZO, ITO, IZO, ITZO, etc. It is also contemplated that one or more ICPs may be utilized, such as, for example, polyaniline, PEDOT:PSS, etc.

Figure 4:
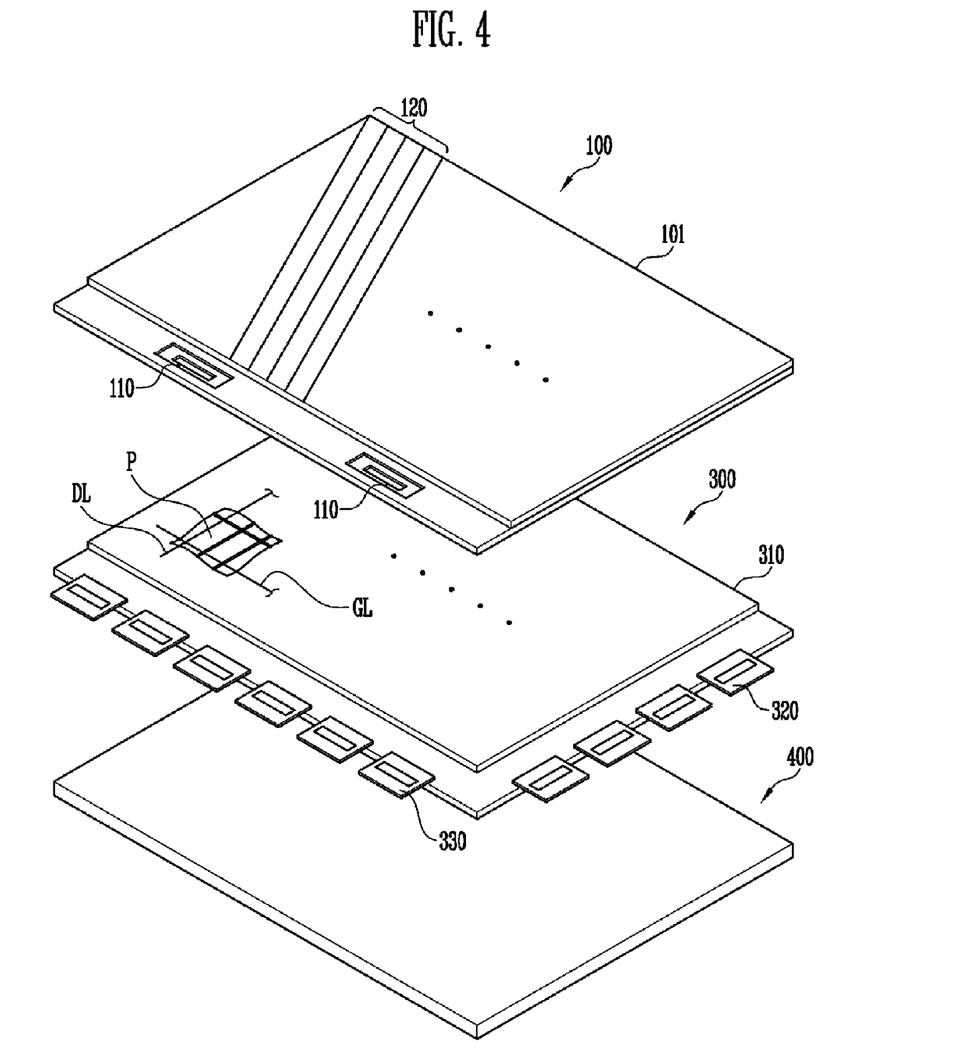
FIG. 4 is an exploded perspective view of a stereoscopic display device including the liquid crystal lens of FIG. 1, according to exemplary embodiments.

FIG. 4 is an exploded perspective view of a stereoscopic display device including the liquid crystal lens of FIG. 1, according to exemplary embodiments.

Referring to FIGS. 1 and 4, the stereoscopic display device may include a lens display panel 100, a display panel unit 300, and a light source unit 400. The lens panel 100 may include the liquid crystal lens 101 and the pad portion 110 configured to receive a driving voltage from a voltage source and supply the received driving voltage to the liquid crystal lens 101. A plurality of bus lines 130 connected to the pad portion 110 may be formed in the non-display area 103 of the liquid crystal lens 101, and a lens unit 120 connected to the plurality of bus lines 130 through the contact portion 140 may be formed in the display area 102 of the liquid crystal lens 101.

The display panel unit 300 may include a display panel 310, a first driver 320, and a second driver 330. The display panel 310 may further include a plurality of data lines DL, a plurality of gate lines GL, and a plurality of pixels P defined by the plurality of data lines DL and the plurality of gate lines GL. The first driver 320 may output a gate signal to the gate lines GL and the second driver 320 may output a data signal to the data lines DL. The pixel P may include a switching element (e.g., a thin film transistor (TFT)), which may be turned on in response to the gate signal, and a liquid crystal capacitor configured to charge the data signal through the switching element. The liquid crystal capacitor may include a pixel electrode, a common electrode, and a liquid crystal layer.

The light source unit 400 may provide light to the display panel 310. The light source unit 400 may provide light to the display panel using various driving methods, such as, for example, a global dimming method, a local dimming method, and/or the like.

An exemplary driving method for the stereoscopic display device is described in more detail below.

When the stereoscopic display device is in a two-dimensional image presentation mode, the display panel unit 300 may display a two-dimensional image in the display panel 310. As such, the lens panel 100 may operate the liquid crystal lens 101 in a "white" mode. The liquid crystal lens 101 in the white mode may be operated so that light transmitted through the display panel 310 may be transmitted without refraction through the liquid crystal lens 101. As such, the stereoscopic display device can display the two-dimensional image.

When the stereoscopic display device is in a three-dimensional image presentation mode, the display panel 300 may display a three-dimensional image in the display panel 310. That is, multi-view images corresponding to the three-dimensional image may be displayed via the display panel 310. As such, the lens display panel 100 may refract light propagating through the liquid crystal lens 101 so that the multi-view images may be respectively refracted to a plurality of viewpoints. In this manner, the stereoscopic display device can display the three-dimensional image.

As described above, according to exemplary embodiments, the bus lines 130 disposed in the non-display area 130 of the liquid crystal lens 101 may have a width of a minimum of 5 μm or more, and the contact portions 140 formed in different layers may be alternately disposed in a zigzag formation at either lateral sides of the first contact portion 140. This may, in turn, decrease the area of the non-display area 103. As such, the area of the non-display area 103 of the liquid crystal lens 101 may be decreased to minimize the entire bezel area of the display device including the liquid crystal lens 101.

Figure 5:
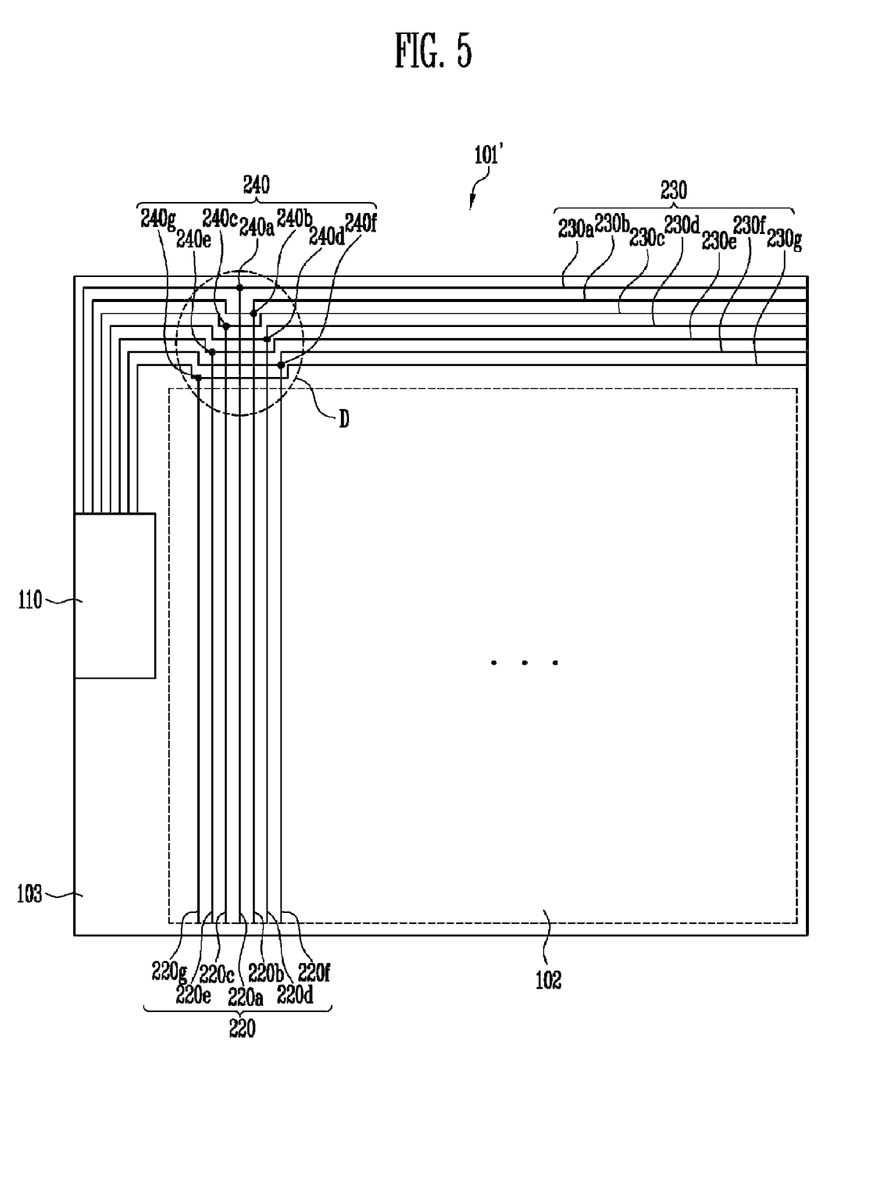
FIG. 5 schematically illustrates a liquid crystal lens, according to exemplary embodiments.
Figure 6:
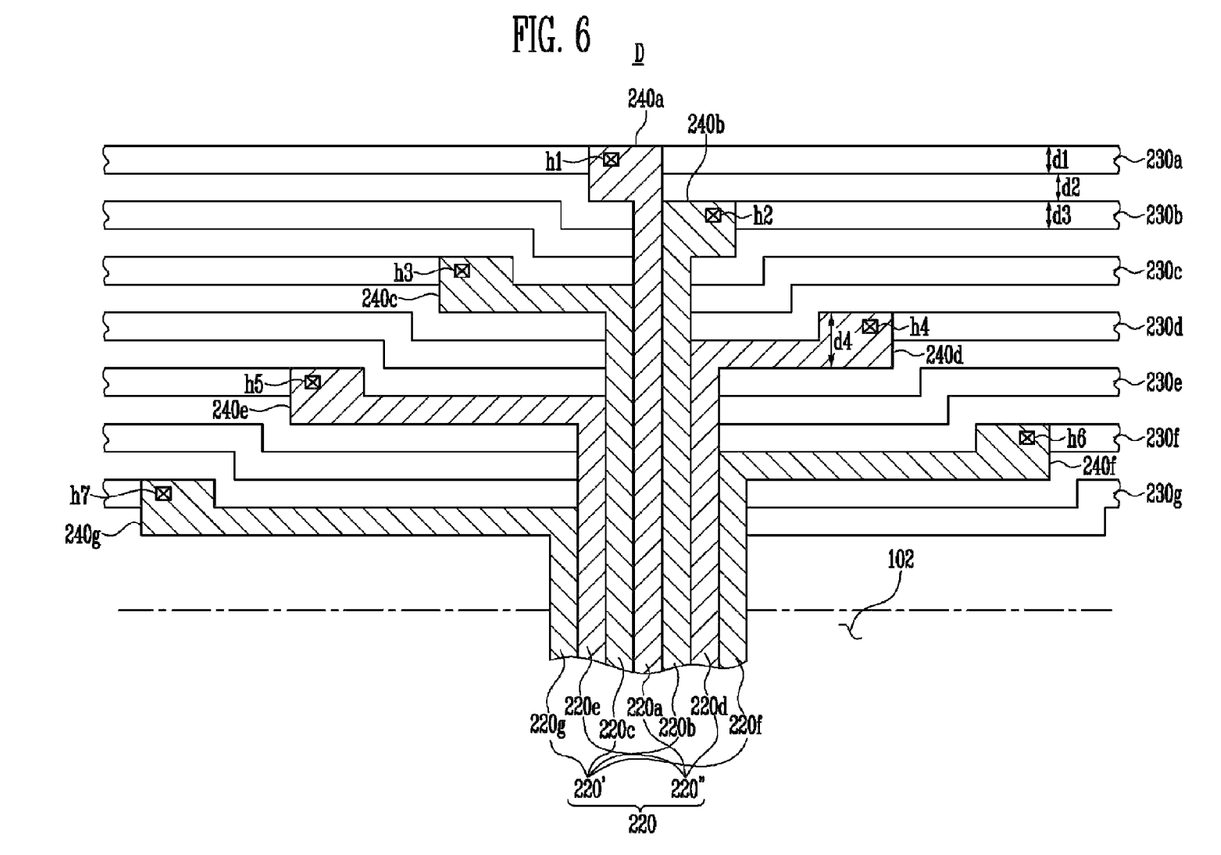
FIG. 6 is an enlarged view of portion D of the liquid crystal lens of FIG. 5, according to exemplary embodiments.

FIG. 5 schematically illustrates a liquid crystal lens, according to exemplary embodiments. FIG. 6 is an enlarged view of portion D of the liquid crystal lens of FIG. 5. It is noted that various components of the liquid crystal lens of FIGS. 5 and 6 are substantially similar to those of the liquid crystal lens of FIGS. 1 and 2. As such, duplicative descriptions will be omitted to avoid obscuring exemplary embodiments described herein.

Referring to FIGS. 5 and 6, the liquid crystal lens 101' is divided into a display area 102 and a non-display area 103. A plurality of lens units 220 may be disposed in the display area 102. The lens unit 220 may include first and second lens electrode portions 220' and 220'', which may be alternately disposed with one another and formed in different layers from each other. The first lens electrode portion 220' may include second and third lens electrodes 220b and 220c, as well as sixth and seventh lens electrodes 220f and 220g, which may be formed in the same layer. The second lens electrode portion 220'' may include a first electrode 220a, as well as fourth and fifth electrodes 220d and 220e, which may be formed in the same layer.

In exemplary embodiments, the lens unit 220 may have a structure in which the lens electrodes formed in different layers are alternately disposed in either lateral direction from the first lens electrode 220a, which may be disposed at (or near) the center of the lens unit 220. As such, the first and seventh lens electrodes 220a to 220g may be formed in different layers and may be alternately disposed adjacent to each other in a first lateral direction. The first and sixth lens electrodes 220a and 220f may also be formed in different layers and may be alternately disposed adjacent to each other in a second lateral direction, which may be opposite the first lateral direction. The third and fifth lens electrodes 220c and 220e may be alternately disposed between the first and seventh lens electrodes 220a and 220g. The second and fourth lens electrodes 220b and 220d may be alternately disposed between the first and sixth lens electrodes 220a and 220f. It is noted that adjacent lens electrodes of the first and second lens electrode portions 220' and 220'' may be disposed adjacent to an extent where the lateral distance between adjacent lens electrodes of the first and second lens electrode portions 220' and 220'' is almost zero.

A plurality of bus lines 230, a pad portion 110 connected to the same side of each of the plurality of bus lines 230, and a contact portion 240 to electrically connect the lens unit 220 to the plurality of bus lines 230 may be disposed in the non-display area 103. The plurality of bus lines 230 may include first to seventh bus lines 230a to 230g connected to the respective first to seventh lens electrodes 220a to 220g via the contact portion 240. In this manner, the contact portion 240 may include first to seventh contact portions 240a to 240g connected to the respective first to seventh bus lines 230a to 230g through first to seventh contact holes h1 to h7.

The first contact portion 240a may be formed of the same material and in the same layer as the first lens electrode 220a, and the second contact portion 240b may be formed of the same material and in the same layer as the second lens electrode 220b. The third contact portion 240c may be formed of the same material and in the same layer as the third lens electrode 220c, and the fourth contact portion 240d may be formed of the same material and in the same layer as the fourth lens electrode 220d. The fifth contact portion 240e may be formed of the same material and in the same layer as the fifth lens electrode 220e, and the sixth contact portion 240f may be formed of the same material and in the same layer as the sixth lens electrode 220f. The seventh contact portion 240g may be formed of the same material and in the same layer as the seventh lens electrode 220g. As such, the first contact portion 240a, as well as the fourth and fifth contact portions 240d and 240e may be formed in the same layer. The second and third contact portions 240b and 240c, as well as the sixth and seventh contact portions 240f and 240g may be formed in the same layer.

According to exemplary embodiments, the second and third contact portions 240b and 240c may be respectively disposed at the right and left sides of the first contact portion 240a, which may be connected to the first bus line 230a through the first contact hole h1 in the non-display area 103. The fourth contact portion 240d may be disposed at the right side of the second contact portion 240b, and the fifth contact portion 240e may be disposed at the left side of the third contact portion 240c. The sixth contact portion 240f may be disposed at the right side of the fourth contact portion 240d, and the seventh contact portion 240g may be disposed at the left side of the fifth contact portion 240e. As such, adjacent contact portions 240 may be formed in different layers from each other.

The contact portions 240 formed in different layers on the bus lines 230 of the non-display area 103 may be alternately disposed in a zigzag formation at either lateral side of the first contact portion 240a. Each of the bus lines 230 may have a width d1 or d3 of a minimum of 5 μm or more, which may be in consideration of a process margin, as well as to decrease the area of the non-display area 103. The distance d2 between the bus lines 230 may also be about 5 μm. For example, the width d1 of the first bus line 230*a* connected to the first contact portion 240*a* through the first contact hole h1 may be substantially the same as width d3 of the second bus line 230*b* connected to the second contact portion 240*b* (formed in the different layer from the first contact portion 240*a*) through the second contact hole h2. The distance d2 between the first and second bus lines 230*a* and 230*b* may also be about 5 μm.

In exemplary embodiments, the second to seventh bus lines 230*b* to 230*g* among the plurality of bus lines 230 respectively have a stepped structure at portions overlapping the corresponding second to seventh contact portions 240*b* to 240*g*. The stepped structures form a bilateral symmetry on the respective bus lines 230 about the first to seventh electrodes 220*a* to 220*g* respectively connected to the first to seventh bus lines 230*a* to 230*g* through the first to seventh contact holes h1 to h7. For example, the stepped structure of the second bus line 230*b* forms a bilateral symmetry on the second bus line 230*b* about the second lens electrode 220*b* connected to the second bus line 230*b* through the second contact hole h2. Further, the second to seventh contact portions 240*b* to 240*g* corresponding to the second to seventh bus lines 230*b* to 230*g* may be positioned at the stepped portions of the second to seventh bus lines 230*b* to 230*g*, respectively.

It is noted that when a bus line 230 is to have a width of a minimum of 5 μm or more in order to decrease the area of the non-display area 103, the second to seventh bus lines 230*b* to 230*g* may be formed in a stepped structure at the portions overlapped with the second to seventh contact portions 240*b* to 240*g*, so that the contact portions 240 can maintain a constant width while not overlapping each other or partially overlapping each other. The second contact portion 240*b* formed in a different layer from the first contact portion 240*a* may overlap the stepped portion of the second bus line 230*b* at the right side of the first contact portion 240*a* connected to the first bus line 230*a* through the first contact hole h1. The third contact portion 240*c* formed in a different layer from the first contact portion 240*a* may overlap the stepped portion of the third bus line 230*c* at the left side of the first contact portion 240*a*.

In exemplary embodiments, the second and third contact portions 240*b* and 240*c* may be formed in the same layer. The second and third contact portions 240*b* and 240*c* may be alternately disposed at either lateral side of the first contact portion 240*a*. The fourth contact portion 240*d* may be formed in a different layer from the second contact portion 240*b*. The fourth contact portion 240*d* may overlap the stepped portion of the fourth bus line 230*d* at the right side of the second contact portion 240*b*. The fifth contact portion 240*e* may be formed in a different layer from the third contact portion 240*c*. The fifth contact portion 240*e* may overlap the stepped portion of the fifth bus line 230*e* at the left side of the third contact portion 240*c*. The sixth contact portion 240*f* may be formed in a different layer from the fourth contact portion 240*d*. The sixth contact portion 240*f* may overlap the stepped portion of the sixth bus line 230*f* at the right side of the fourth contact portion 240*d*. The seventh contact portion 240*g* may be formed in a different layer from the fifth contact portion 240*e*. The seventh contact portion 240*g* may overlap the stepped portion of the seventh bus line 230*f* at the left side of the fifth contact portion 240*e*. As such, the contact portions 240 including the first to seventh contact portions 240*a* to 240*g* may overlap the stepped portions of the corresponding bus lines 230 in the non-display area 103. The second to seventh contact portions 240*b* to 240*g* may be alternately disposed in the zigzag formation at either lateral side of the first contact portion 240*a*.

As described above, the bus lines 230 may be designed so that the respective portions of the bus lines 230 that overlap the corresponding contact portions 240 may be stepped. To this end, the width of the respective bus lines 230 may be a minimum of 5 μm or more in consideration of a process margin affecting one or more manufacturing processes. Further, the other contact portions 240*b* to 240*g* may be alternately disposed at either lateral side of the first contact portion 240*a*, while overlapping the stepped portions of the corresponding bus lines 230, which may minimize the area of the non-display area 103. As such, it may be possible to minimize the entire bezel area of the display device including the liquid crystal lens 101'.

According to exemplary embodiments, a plurality of bus lines may be formed in a non-display area. The plurality of bus lines may be respectively connected to first and second lens electrodes of a lens unit. As such, the number of the plurality of bus lines may be determined by the number of first and second lens electrodes disposed in a display area. If the number of the first and second lens electrodes disposed in the display area is increased, the number of the plurality of bus lines respectively connected to the first and second lens electrodes may be increased. It is noted that the area of the non-display area including the plurality of bus lines disposed therein may be increased. As the area of the non-display area is increased, the entire area of a bezel area including the non-display area may be increased that, in turn, may cause a screen to be viewed smaller than an actual size of the screen of the display device including the liquid crystal lens. According to exemplary embodiments, however, it is possible to provide a liquid crystal lens and a stereoscopic display device using the same, in which the width of a bus line is decreased and the structure of a contact portion contacted with the bus line is disposed in a zigzag formation, which may minimize (or at least reduce) the size of a bezel area including the bus lines.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal lens, comprising:
    a lens unit, the lens unit comprising:
        a first lens electrode disposed in at least a display area;
        a second lens electrode disposed in at least the display area and adjacent to the first lens electrode in a first direction; and
        a third lens electrode disposed in at least the display area and adjacent to the first lens electrode in a second direction opposite the first direction;
    bus lines disposed in a peripheral area, the peripheral area being disposed outside the display area, the first lens electrode, the second lens electrode, and the third lens electrode being connected to respective ones of the bus lines; and
    a contact portion comprising a first contact portion, a second contact portion, and a third contact portion, the contact portion overlapping the bus lines and electrically connecting the respective bus lines to the first lens electrode, the second lens electrode, and the third lens electrode via the first contact portion, the second contact portion, and the third contact portion, respectively,
wherein the first contact portion, the second contact portion, and the third contact portion are disposed in a zigzag pattern comprising an imaginary line connecting the second contact portion and the third contact portion, the imaginary line overlapping the first lens electrode.

2. The liquid crystal lens of claim 1, further comprising:
a first insulating layer; and
a second insulating layer disposed on the first insulating layer,
wherein the first lens electrode is disposed on the second insulating, layer
wherein the second lens electrode and the third lens electrode are disposed on the first insulating layer, and
wherein the contact portion comprises:
the first contact portion disposed in the same layer as the first lens electrode; and
the second contact portion and the third contact portion disposed in the same layer as the second lens electrode and the third lens electrode.

3. The liquid crystal lens of claim 2, wherein:
the first contact portion connects the first lens electrode to a first bus line of the bus lines through a contact hole penetrating the first insulating layer and the second insulating layer;
the second contact portion connects the second lens electrode to a second bus line of the bus lines through a second contact hole penetrating the first insulating layer; and
the third contact portion connects the third lens electrode to a third bus line of the bus lines through a third contact hole penetrating the first insulating layer.

4. The liquid crystal lens of claim 1, wherein:
a first one of the bus lines extends in a substantially linear formation; and
the other bus lines comprise a stepped structure at a portion overlapping the contact portion.

5. The liquid crystal lens of claim 4, wherein each stepped structure is bilaterally symmetrical about a common imaginary axis.

6. The liquid crystal lens of claim 4, wherein the width of each of the bus lines is substantially the same as the spacing between adjacent bus lines.

7. The liquid crystal lens of claim 1, further comprising:
a pad portion disposed in the peripheral area,
wherein each of the bus lines is connected to the pad portion.

8. A stereoscopic display device, comprising:
a display panel configured to display a two-dimensional image;
a liquid crystal lens disposed on the display panel, the liquid crystal lens comprising:
a lens unit comprising:
a first lens electrode disposed in at least the display area;
a second lens electrode disposed in at least the display area and adjacent to the first lens electrode in a first direction; and
a third lens electrode disposed in at least the display area and adjacent to the first lens electrode in a second direction opposite the first direction;
bus lines disposed in a peripheral area, the peripheral area being disposed outside the display area, and the first lens electrode, the second lens electrode, and the third lens electrode being connected to respective ones of the bus lines; and
a contact portion comprising a first contact portion, a second contact portion, and a third contact portion, the contact portion overlapping the bus lines and electrically connecting the respective bus lines to the first lens electrode, the second lens electrode, and the third lens electrode via the first contact portion, the second contact portion, and the third contact portion, respectively; and
a voltage source configured to apply voltage to the first lens electrode, the second lens electrode, and the third lens electrode,
wherein the two-dimensional image is perceived as a stereoscopic image through the liquid crystal lens, and
wherein the first contact portion, the second contact portion, and the third contact portion are disposed in a zigzag pattern comprising an imaginary line connecting the second contact portion and the third contact portion, the imaginary line overlapping the first lens electrode.

9. The stereoscopic display device of claim 8, further comprising:
a first insulating layer; and
a second insulating layer disposed on the first insulating layer,
wherein the first lens electrode is disposed on the second insulating layer;
wherein the second lens electrode and the third lens electrode are disposed on the first insulating layer, and
wherein the contact portion comprises:
the first contact portion disposed in the same layer as the first lens electrode; and
the second contact portion and the third contact portion disposed in the same layer as the second lens electrode and the third lens electrode.

10. The stereoscopic display device of claim 9, wherein:
the first contact portion connects the first lens electrode to a first bus line of the bus lines through a first contact hole penetrating the first insulating layer and the second insulating layer;
the second contact portion connects the second lens electrode to a second bus line of the bus lines through a second contact hole penetrating the first insulating layer; and
the third contact portion connects the third lens electrode to a third bus line of the bus lines through a third contact hole penetrating the first insulating layer.

11. The stereoscopic display device of claim 8, wherein:
a first one of the bus lines extends in a substantially linear formation; and
the other bus lines comprise a stepped structure at a portion overlapping the contact portion.

12. The stereoscopic display device of claim 11, wherein each stepped structure is bilaterally symmetrical about a common imaginary axis.

13. The stereoscopic display device of claim 11, wherein the width of each of the bus lines is substantially the same as the spacing between adjacent bus lines.

14. The stereoscopic display device of claim 8, further comprising:
a pad portion disposed in the peripheral area,
wherein each of the bus lines is connected to the pad portion.

15. The liquid crystal lens of claim 1, further comprising:
a liquid crystal layer disposed on the first lens electrode, the second lens electrode, and the third lens electrode; and a common lens electrode disposed on the liquid crystal layer.

16. The stereoscopic display device of claim 8, wherein the liquid crystal lens further comprises:
a liquid crystal layer disposed on the first lens electrode, the second lens electrode, and the third lens electrode; and
a common lens electrode disposed on the liquid crystal layer.

17. The liquid crystal lens of claim 1, wherein, in the peripheral area:
the first lens electrode is longer than the second lens electrode; and
the second lens electrode is longer than the third lens electrode.

18. The liquid crystal lens of claim 3, wherein:
the first bus line is spaced apart from the second bus line by a distance d1;
the second bus line is spaced apart from the third bus line by a distance d2; and
d1 >d2.

* * * * *